(12) United States Patent
Chun et al.

(10) Patent No.: US 8,862,162 B2
(45) Date of Patent: Oct. 14, 2014

(54) EFFECTIVE SYSTEM INFORMATION RECEPTION METHOD

(75) Inventors: Sung-Duck Chun, Anyang-si (KR); Young-Dae Lee, Anyang-si (KR); Sung-Jun Park, Anyang-si (KR); Seung-June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/431,795

(22) Filed: Mar. 27, 2012

(65) Prior Publication Data

US 2012/0231820 A1 Sep. 13, 2012

Related U.S. Application Data

(63) Continuation of application No. 12/143,607, filed on Jun. 20, 2008, now Pat. No. 8,190,144.

(60) Provisional application No. 60/945,340, filed on Jun. 20, 2007, provisional application No. 60/955,651, filed on Aug. 14, 2007.

(30) Foreign Application Priority Data

Jun. 18, 2008 (KR) ........................ 10-2008-0057283

(51) Int. Cl.
*H04W 68/00* (2009.01)
*H04W 48/12* (2009.01)
*H04W 48/16* (2009.01)

(52) U.S. Cl.
CPC .............. *H04W 48/12* (2013.01); *H04W 48/16* (2013.01)
USPC ............................ 455/458; 370/311; 370/350

(58) Field of Classification Search
USPC ............. 455/422.1, 450–453, 44, 509, 426.1, 455/552.1, 553.1, 435.2, 458, 510; 370/310, 322, 329, 348, 330, 328, 338, 370/311, 312, 350
See application file for complete search history.

(56) References Cited

U.S. PATENT DOCUMENTS

| 5,802,064 | A | 9/1998 | Lieberman |
| 5,878,041 | A | 3/1999 | Yamanaka et al. |
| 6,557,135 | B1 | 4/2003 | Balachandran et al. |
| 6,594,244 | B1 | 7/2003 | Chang et al. |

(Continued)

FOREIGN PATENT DOCUMENTS

| CN | 1314747 | 9/2001 |
| CN | 1339903 | 3/2002 |

(Continued)

OTHER PUBLICATIONS

Amitava Ghosh et al., "Random Access Design for UMTS Air-Interface Evolution", pp. 1041-1045, Apr. 2007.

(Continued)

*Primary Examiner* — Daniel Lai
(74) *Attorney, Agent, or Firm* — Lee, Hong, Degerman, Kang & Waimey

(57) ABSTRACT

Disclosed is the method for informing, by a wireless communication system, to a terminal about information required for reception when the terminal is connected to the wireless communication system, in which a base station updates system information according to a preset period, and the terminal efficiently receives or checks any update of the system information based on the period.

13 Claims, 6 Drawing Sheets

(56) References Cited

U.S. PATENT DOCUMENTS

| | | |
|---|---|---|
| 6,628,946 B1 | 9/2003 | Wiberg et al. |
| 6,788,944 B2 | 9/2004 | Jiang |
| 6,862,450 B2 | 3/2005 | Mikola et al. |
| 6,987,985 B2 | 1/2006 | Purkayastha et al. |
| 7,009,940 B2 | 3/2006 | Vialen et al. |
| 7,400,593 B2 | 7/2008 | Choi et al. |
| 7,450,933 B2 | 11/2008 | Kwak et al. |
| 7,486,699 B2 | 2/2009 | Yi et al. |
| 7,525,908 B2 | 4/2009 | Olsson et al. |
| 7,876,771 B2 | 1/2011 | Bergstrom et al. |
| 8,027,321 B2 | 9/2011 | Zheng |
| 8,130,687 B2 | 3/2012 | Cai et al. |
| 8,160,012 B2 | 4/2012 | Chun et al. |
| 8,190,144 B2 | 5/2012 | Chun et al. |
| 8,203,988 B2 | 6/2012 | Chun et al. |
| 8,243,931 B2 | 8/2012 | Yi et al. |
| 8,270,348 B2 | 9/2012 | Chun et al. |
| 8,351,388 B2 | 1/2013 | Chun et al. |
| 2002/0114280 A1 | 8/2002 | Yi et al. |
| 2003/0002472 A1* | 1/2003 | Choi et al. ............ 370/347 |
| 2004/0003106 A1 | 1/2004 | Cunningham et al. |
| 2004/0008659 A1 | 1/2004 | Kim |
| 2004/0103435 A1* | 5/2004 | Yi et al. ............... 725/81 |
| 2004/0117860 A1 | 6/2004 | Yi et al. |
| 2004/0156330 A1 | 8/2004 | Yi et al. |
| 2004/0208160 A1 | 10/2004 | Petrovic et al. |
| 2004/0229626 A1 | 11/2004 | Yi et al. |
| 2004/0235447 A1 | 11/2004 | Gronberg et al. |
| 2005/0026597 A1 | 2/2005 | Kim et al. |
| 2005/0041663 A1 | 2/2005 | Jiang |
| 2005/0041681 A1 | 2/2005 | Lee et al. |
| 2005/0047416 A1 | 3/2005 | Heo et al. |
| 2005/0100048 A1 | 5/2005 | Chun et al. |
| 2005/0105499 A1 | 5/2005 | Shinozaki et al. |
| 2005/0164683 A1 | 7/2005 | Roberts et al. |
| 2005/0169293 A1 | 8/2005 | Zhang et al. |
| 2005/0192021 A1 | 9/2005 | Lee et al. |
| 2005/0193309 A1 | 9/2005 | Grilli et al. |
| 2005/0195852 A1* | 9/2005 | Vayanos et al. ......... 370/437 |
| 2005/0213605 A1 | 9/2005 | Kim et al. |
| 2005/0237960 A1 | 10/2005 | Kim |
| 2005/0237972 A1 | 10/2005 | Van Dervelde et al. |
| 2005/0238051 A1 | 10/2005 | Yi et al. |
| 2005/0249141 A1 | 11/2005 | Lee et al. |
| 2005/0286483 A1 | 12/2005 | Lee et al. |
| 2006/0056441 A1 | 3/2006 | Jiang |
| 2006/0067238 A1 | 3/2006 | Olsson et al. |
| 2006/0067361 A1* | 3/2006 | Lee et al. ............. 370/466 |
| 2006/0067364 A1 | 3/2006 | Jung et al. |
| 2006/0072503 A1 | 4/2006 | Kim et al. |
| 2006/0098574 A1 | 5/2006 | Yi et al. |
| 2006/0165045 A1 | 7/2006 | Kim et al. |
| 2006/0182065 A1 | 8/2006 | Petrovic et al. |
| 2006/0251027 A1 | 11/2006 | Chun et al. |
| 2006/0281456 A1 | 12/2006 | Roberts et al. |
| 2007/0041397 A1 | 2/2007 | Hwang |
| 2007/0091810 A1 | 4/2007 | Kim et al. |
| 2007/0117579 A1 | 5/2007 | Cai et al. |
| 2007/0133456 A1* | 6/2007 | Ding ................... 370/328 |
| 2007/0177628 A1 | 8/2007 | Choi et al. |
| 2007/0183358 A1 | 8/2007 | Cai |
| 2007/0206530 A1 | 9/2007 | Lee et al. |
| 2007/0206531 A1 | 9/2007 | Pajukoski et al. |
| 2007/0223526 A1 | 9/2007 | Jiang |
| 2007/0258591 A1 | 11/2007 | Terry et al. |
| 2007/0287440 A1* | 12/2007 | Benkert et al. ......... 455/422.1 |
| 2007/0297360 A1 | 12/2007 | Joachim et al. |
| 2007/0297367 A1 | 12/2007 | Wang et al. |
| 2008/0002688 A1 | 1/2008 | Kim et al. |
| 2008/0043658 A1 | 2/2008 | Worrall |
| 2008/0043670 A1 | 2/2008 | Marinier |
| 2008/0045224 A1 | 2/2008 | Lu et al. |
| 2008/0045272 A1 | 2/2008 | Wang et al. |
| 2008/0059859 A1 | 3/2008 | Marinier et al. |
| 2008/0081598 A1 | 4/2008 | Chandra et al. |
| 2008/0101609 A1 | 5/2008 | Jiang |
| 2008/0165717 A1 | 7/2008 | Chen et al. |
| 2008/0165755 A1 | 7/2008 | Marinier et al. |
| 2008/0170526 A1* | 7/2008 | Narang et al. .......... 370/311 |
| 2008/0186946 A1 | 8/2008 | Marinier et al. |
| 2008/0212561 A1 | 9/2008 | Pani et al. |
| 2008/0212605 A1 | 9/2008 | Jiang |
| 2008/0232396 A1 | 9/2008 | Buckley et al. |
| 2008/0233940 A1 | 9/2008 | Jen |
| 2008/0233941 A1 | 9/2008 | Jen |
| 2008/0268878 A1 | 10/2008 | Wang et al. |
| 2008/0273482 A1 | 11/2008 | Lee et al. |
| 2008/0273610 A1 | 11/2008 | Malladi et al. |
| 2009/0005058 A1 | 1/2009 | Kazmi et al. |
| 2009/0041240 A1 | 2/2009 | Parkvall et al. |
| 2009/0046667 A1 | 2/2009 | Pelletier et al. |
| 2009/0116434 A1 | 5/2009 | Lohr et al. |
| 2009/0119564 A1 | 5/2009 | Sagfors et al. |
| 2009/0156194 A1 | 6/2009 | Meylan |
| 2009/0175253 A1 | 7/2009 | Wu et al. |
| 2009/0190480 A1 | 7/2009 | Sammour et al. |
| 2009/0232076 A1 | 9/2009 | Kuo |
| 2009/0318177 A1 | 12/2009 | Wang et al. |
| 2009/0323574 A1 | 12/2009 | Koskinen et al. |
| 2010/0014466 A1 | 1/2010 | Meyer et al. |
| 2010/0091750 A1 | 4/2010 | Lee et al. |
| 2010/0128648 A1 | 5/2010 | Lee et al. |
| 2010/0142429 A1 | 6/2010 | Yi et al. |
| 2010/0157904 A1 | 6/2010 | Ho et al. |
| 2010/0232335 A1 | 9/2010 | Lee et al. |
| 2010/0260140 A1 | 10/2010 | Zhu |
| 2011/0019604 A1 | 1/2011 | Chun et al. |
| 2013/0258919 A1 | 10/2013 | Damnjanovic |

FOREIGN PATENT DOCUMENTS

| | | |
|---|---|---|
| CN | 1349360 A | 5/2002 |
| CN | 1396780 | 2/2003 |
| CN | 1549610 | 11/2004 |
| CN | 1613210 A | 5/2005 |
| CN | 1642067 | 7/2005 |
| CN | 1643820 | 7/2005 |
| CN | 1761260 | 4/2006 |
| CN | 1761356 | 4/2006 |
| CN | 1792048 | 6/2006 |
| CN | 1846365 | 10/2006 |
| CN | 1868157 | 11/2006 |
| CN | 1918825 | 2/2007 |
| CN | 1938969 | 3/2007 |
| CN | 1954521 | 4/2007 |
| CN | 101090281 | 12/2007 |
| CN | 101690375 | 9/2012 |
| EP | 1035745 | 9/2000 |
| EP | 1263160 | 12/2002 |
| EP | 1343267 | 9/2003 |
| EP | 1509011 | 2/2005 |
| EP | 1557967 | 7/2005 |
| EP | 1638237 | 3/2006 |
| EP | 1655879 | 5/2006 |
| EP | 2026523 | 2/2009 |
| EP | 2163006 | 3/2012 |
| JP | 06-053921 A | 2/1994 |
| JP | 07-162948 | 6/1995 |
| JP | 2000-324161 | 11/2000 |
| JP | 2001-197021 | 7/2001 |
| JP | 2003-018050 | 1/2003 |
| JP | 2003-115796 | 4/2003 |
| JP | 03115876 | 4/2003 |
| JP | 2003-283592 | 10/2003 |
| JP | 2005-073276 | 3/2005 |
| JP | 2006-054718 | 2/2006 |
| JP | 2006-505209 | 2/2006 |
| JP | 2006-514466 | 4/2006 |
| JP | 2006-121562 | 5/2006 |
| JP | 2006311543 | 11/2006 |
| JP | 2007116639 | 5/2007 |
| JP | 2008-520125 | 6/2008 |
| JP | 2009-521891 | 6/2009 |
| JP | 2010518683 A | 5/2010 |

(56) References Cited

FOREIGN PATENT DOCUMENTS

| KR | 10-2001-0045783 | 6/2001 |
|---|---|---|
| KR | 10-2002-0097304 | 12/2002 |
| KR | 1020030012048 | 2/2003 |
| KR | 2003-0060055 | 7/2003 |
| KR | 10-2003-0087914 | 11/2003 |
| KR | 10-2004-0016334 | 2/2004 |
| KR | 10-2004-0034398 | 4/2004 |
| KR | 10-2005-0029395 | 3/2005 |
| KR | 10-2005-0081836 | 8/2005 |
| KR | 10-2005-0099472 | 10/2005 |
| KR | 10-2005-0103127 | 10/2005 |
| KR | 10-2006-0051278 | 5/2006 |
| KR | 10-2006-0090191 | 8/2006 |
| KR | 10-0907978 | 7/2009 |
| KR | 10-2009-0084320 | 8/2009 |
| KR | 10-2009-0084756 | 8/2009 |
| WO | 99/37114 | 7/1999 |
| WO | 01/22645 | 3/2001 |
| WO | 01/67664 | 9/2001 |
| WO | 02/45453 | 6/2002 |
| WO | 2004/042963 | 5/2004 |
| WO | 2004/042964 | 5/2004 |
| WO | 2004/102838 | 11/2004 |
| WO | 2005/022814 | 3/2005 |
| WO | 2005/078967 | 8/2005 |
| WO | 2005/079105 | 8/2005 |
| WO | 2005/109671 | 11/2005 |
| WO | 2005/122441 | 12/2005 |
| WO | 2005125226 | 12/2005 |
| WO | 2006/016785 | 2/2006 |
| WO | 2006/033521 | 3/2006 |
| WO | 2006/052086 | 5/2006 |
| WO | 2006046894 | 5/2006 |
| WO | 2006/075820 | 7/2006 |
| WO | 2006/095385 | 9/2006 |
| WO | 2006/104335 | 10/2006 |
| WO | 2006/104342 | 10/2006 |
| WO | 2006/104773 | 10/2006 |
| WO | 2006/116620 | 11/2006 |
| WO | 2006/118435 | 11/2006 |
| WO | 2007/023364 | 3/2007 |
| WO | 2007/039023 | 4/2007 |
| WO | 2007/045505 | 4/2007 |
| WO | 2007/052921 | 5/2007 |
| WO | 2007/078155 | 7/2007 |
| WO | 2007/078174 | 7/2007 |
| WO | 2007078156 | 7/2007 |
| WO | 2007/091831 | 8/2007 |
| WO | 2007/091838 | 8/2007 |
| WO | 2007/147431 | 12/2007 |
| WO | 2008060097 | 5/2008 |
| WO | 2008/094120 | 8/2008 |
| WO | 2009/035301 | 3/2009 |

OTHER PUBLICATIONS

NEC, "Considerations on Scheduling Information", R2-073556, 3GPP TSG-RAN WG2#59, Aug. 2007.
ITRI, "Buffer Status Reporting with Group Combining for LTE", R2-072833, 3GPP TSG-RAN-WG2 Meeting #58bis, Jun. 2007.
ASUSTeK, "On-line recovery of HFN synchronization due to RLC UM SN problem", R2-041940, 3GPP TSG-RAN WG2 meeting #44, Oct. 2004.
Rapporteur (ASUSTeK), "Summary of HFN de-synchronization problem off-line email discussion", R2-050318, 3GPP TSG RAN WG2 #46, Feb. 2005.
LG Electronics Inc., "Correction to Polling Procedure", R2-081588, 3GPP TSG-RAN WG2 #61 bis, Mar. 2008.
3rd Generation Partnership Project, "Universal Mobile Telecommunications System (UMTS); Radio Link Control (RLC) protocol specification (3GPP TS 25.322 version 4.10.0 Release 4)", ETSI TS 125 322 V4.10.0, Sep. 2003, XP-014016803.
Alcatel-Lucent, "PDCP status report carrying LIS only", R2-080902, 3GPP TSG RAN WG2 #61, Jan. 2008.
LG Electronics Inc., "Correction of status report coding", R2-080969, 3GPP TSG RAN WG2 #61, Feb. 2008, XP-002624626.
LG Electronics, "Update of eUtran PDCP specification", R2-081390, 3GPP TSG-RAN2 Meeting #61, Jan. 2008.
Ericsson, "RLC status report format", R2-074701, TSG-RAN WG2 Meeting #60, Nov. 2007.
3rd Generation Partnership Project (3GPP); "Technical Specification Group Radio Access Network; Evolved Universal Terrestrial Radio Access (E-UTRA) Medium Access Control (MAC) protocol specification (Release 8)", 3GPP TS 36.321 V1.0.0, Sep. 2007.
3rd Generation Partnership Project (3GPP); "Technical Specification Group Radio Access Network; Medium Access Control (MAC) protocol specification (Release 7)", 3GPP TS 25.321 V7.5.0, Jun. 2007.
Chairman, "LTE User Plane session report", R2-074536, 3GPP TSG-RAN WG2 #59bis, Oct. 2008.
ASUSTeK Computer Inc., "HFN de-synchronization detection with Integrity Protection scheme in a wireless communications system", U.S. Appl. No. 60/863,800.
Texas Instruments, "UL Synchronization Management in LTE_ACTIVE", R1-071478, 3GPP TSG RAN WG1 #48bis, Mar. 2007.
Texas Instruments, "UL Synchronization Management and Maintenance in E-UTRA", R1-072198, 3GPP TSG RAN WG1 #49, May 2007.
LG Electronics Inc., "UE state transition in LTE_ACTIVE", R2-061002, 3GPP TSG RAN WG2 #52, Mar. 2006.
NTT DoCoMo, Inc., "Miscellaneous corrections to TS 36.322", R2-081700, 3GPP TSG-RAN2 Meeting #61bis, Mar. 2008.
Ericsson, "Clarification to the handling of large RLC status reports", R2-082018, 3GPP TSG-RAN2 Meeting #61bis, Mar. 2008.
LG Electronics Inc. et al., "ACK_SN setting for short Status PDU", R2-082133, 3GPP TSG-RAN WG2 #62, May 2008.
U.S. Appl. No. 12/452,905, Final Office Action dated Apr. 11, 2013, 20 pages.
U.S. Appl. No. 12/671,020, Notice of Allowance dated Feb. 14, 2013, 13 pages.
U.S. Appl. No. 13/107,329, Office Action dated Feb. 15, 2013, 10 pages.
Alcatel-Lucent, "Format for RACH Message 2", 3GPP TSG RAN WG2 #60bis, R2-080176, Jan. 2008.
Motorola, "Design of Backoff Scheme for LTE", 3GPP TSG RAN WG2, Meeting #56bis, R2-070143, Jan. 2007.
MAC Rapporteurs, et al., "E-UTRA MAC Protocol Specification Update", 3GPP TSG RAN2 Meeting #60bis, R2-080631, Jan. 2008.
Catt, "Notification scheme for system information Change", R2-071870, 3GPP TSG-RAN WG2#58, May 2007, 5 pages.
LG Electronics Inc., "Discussion on BCCH Update", R2-072736, 3GPP TSG-RAN WG2 #58bis, Jun. 2007, 3 pages.
European Patent Office Application Serial No. 08011263.4, Search Report dated Dec. 7, 2012, 8 pages.
U.S. Appl. No. 13/107,232, Notice of Allowance dated Jan. 30, 2013, 17 pages.
Ericsson, "RLC status report format", R2-074701, TSG-RAN WG2 Meeting #60, Nov. 2007, 3 pages.
State Intellectual Property Office of the People's Republic of China Application Serial No. 200980100119.3, Office Action dated Feb. 5, 2013, 14 pages.
National Office of Intellectual Property of Vietnam Application No. 1-2010-00637, Notice of Allowance dated Mar. 28, 2013, 1 page.
NTT DoCoMo, Inc., "Uplink synchronization maintenance", R2-072014, 3GPP TSG RAN WG2 #58, May 2007, 4 pages, XP50134889.
European Patent Office Application Serial No. 08766423.1, Office Action dated Nov. 5, 2012, 5 pages.
ZTE, "Redundant retransmission restraint in RLC-AM", R2-061234, 3GPP TSG-RAN WG2 meeting #53, May 2006, 5 pages.
Reuven Cohen, "An Improved SSCOP-like Scheme for Avoiding Unnecessary Retransmissions and Achieving Ideal Throughput", Conference on Computer Communications, Mar. 2006, 8 pages.
European Patent Office Application Serial No. 08766509.7, Office Action dated Dec. 5, 2012, 9 pages.
National Office of Intellectual Property of Vietnam Application Serial No. 1-2010-00246, Office Action dated Jan. 25, 2013, 2 pages.

(56) References Cited

OTHER PUBLICATIONS

National Office of Intellectual Property of Vietnam Application No. 1-2010-00247, Office Action dated Feb. 26, 2013, 1 page.
U.S. Appl. No. 12/733,179, Office Action dated Oct. 31, 2012, 32 pages.
U.S. Appl. No. 13/441,698, Office Action dated Nov. 21, 2012, 31 pages.
U.S. Appl. No. 12/738,625, Office Action dated Oct. 24, 2012, 103 pages.
U.S. Appl. No. 12/452,733, Final Office Action dated Jan. 8, 2013, 19 pages.
3rd Generation Partnership Project (3GPP), "3rd Generation Partnership Project; Technical Specification Group Radio Access Network; Radio Link Control (RLC) protocol specification (Release 6)," 3GPP TS 25.322 V6.5.0, Sep. 2005, XP050129441, 79 pages (relevant portions: paragraphs [9.7.1], [11.3.2] and [11.3.2.1.1]).
Zhang, et al., "Performance of UMTS Radio Link Control," Proceedings of IEEE International Conference on Communications, XP010590089, Apr. 2002, 5 pages.
European Patent Office Application Serial No. 08164559.0, Search Report dated Jun. 27, 2013, 8 pages.
U.S. Appl. No. 12/672,999, Final Office Action dated Jun. 6, 2013, 12 pages.
3rd Generation Partnership Project (3GPP), "Technical Specification Group Radio Access Network; Evolved Universal Terrestrial Radio Access (E-UTRA) Radio Link Control (RLC) protocol specification (Release 8)," 3GPP TS 36.322 V8.0.0, Dec. 2007, 10 pages.
The State Intellectual Property Office of the People's Republic of China Application Serial No. 200980100119.3, Office Action dated Aug. 13, 2013, 14 pages.
U.S. Appl. No. 12/234,574, Office Action dated Aug. 14, 2013, 18 pages.
U.S. Appl. No. 12/672,835, Final Office Action dated May 9, 2013, 16 pages.
European Patent Office Application Serial No. 08164607.7, Search Report dated Jul. 12, 2013, 8 pages.
3rd Generation Partnership Project (3GPP), "3rd Generation Partnership Project; Technical Specification Group Radio Access Network; Radio Link Control (RLC) protocol specification (Release 7)," 3GPP TS 25.322 V7.3.0, Jun. 2007, XP050367795, 81 pages (relevant portions: sections [4.2.1], [9.5], [9.7.3] and [11.6]).
The State Intellectual Property Office of the People's Republic of China Application Serial No. 200880107176.X, Certificate dated May 15, 2013, 15 pages.
Masson, "E-UTRA RACH within the LTE system," XP-002448009, Feb. 2006, 82 pages (relevant pp. 60 (numbered p. 42) and 61 (numbered p. 43)).
LG Electronics Inc., "RACH procedure," 3GPP TSG-RAN WG2 #59, R2-073043, XP-002515770, Aug. 2007, 3 pages.
LG Electronics, "Discussion on random access back-off procedure," 3GPP TSG-RAN WG2 #60bis, R2-080189, Jan. 2008, 5 pages.
3rd Generation Partnership Project (3GPP), Technical Specification Group Radio Access Network; Evolved Universal Terrestrial Radio Access (E-UTRA) Medium Access Control (MAC) protocol specification (Release 8), 3GPP TS 36.321 V8.0.0, XP-002520880, Dec. 2007, 23 pages.
European Patent Office Application Serial No. 09151778.9, Search Report dated Jun. 11, 2013, 8 pages.
Qualcomm Europe, "General Corrections to RLC," 3GPP TSG-RAN Working Group 2 #22, Tdoc R2-011701, Jul. 2001, 12 pages.
LG Electronics Inc., "Out-of-sequence problem in AM RLC: Discretely discarded SDUs," 3GPP TSG-RAN WG2 Meeting #21, R2-011206, May 2001, 2 pages.
Japan Patent Office Application Serial No. 2012-151205, Office Action dated Apr. 16, 2013, 2 pages.
State Intellectual Property Office of the People's Republic of China Application Serial No. 200880021003.6, Certificate dated Apr. 3, 2013, 15 pages.
U.S. Appl. No. 12/922,538, Final Office Action dated Apr. 19, 2013, 10 pages.
LG Electronics, "Overall control signaling structure for generic LTE TDD", R1-071848, 3GPP TSG RAN WG1 LTE TDD Ad Hoc, Apr. 2007, 4 pages.
Siemens, "Signaling in DL for uplink resource allocation", R1-061290, 3GPP TSG RAN WG1#45, May 2006, 6 pages.
European Patent Office Application Serial No. 08793155.6, Search Report dated Jan. 8, 2014, 10 pages.
3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321 V8.2.0, May 2008, 33 pages.
ASUSTeK, "Minor corrections to 36.321," 3GPP TSG-RAN WG2 Meeting #67, R2-095152, Aug. 2009, 6 pages.
U.S. Appl. No. 12/733,179, Final Office Action dated Apr. 18, 2013, 21 pages.
Japan Patent Office Application Serial No. 2012-041575, Office Action dated Aug. 27, 2013, 2 pages.
The State Intellectual Property Office of the People's Republic of China Application Serial No. 200880021023.3, Certificate of Invention dated Jul. 31, 2013, 17 pages.
LG Electronics, "Delivery of LTE System Information," 3GPP TSG-RAN WG2 ad-hoc on LTE, R2-061959, Jun. 2006, 4 pages.
Qualcomm Europe, "L2 improvements and polling," 3GPP TSG-RAN3 WG2 Meeting #58, R2-072021, May 2007, 3 pages.
U.S. Appl. No. 12/672,835, Office Action dated Sep. 11, 2013, 16 pages.
European Patent Office Application Serial No. 08832469.4, Search Report dated Dec. 20, 2013, 5 pages.
Nokia, "System Information Change Indication," 3GPP TSG-RAN WG2 Meeting #57bis, R2-071739, May 2007, 3 pages.
European Patent Office Application Serial No. 08766382.9, Search Report dated Dec. 13, 2013, 7 pages.
European Patent Office Application Serial No. 08766415.7, Search Report dated Jan. 2, 2014, 8 pages.
U.S. Appl. No. 13/541,574, Office Action dated Oct. 23, 2013, 6 pages.
3GPP TS 25.331 V6.6.0, Release 6, Jun. 2005, 1153 pages.
Korean Intellectual Property Office Application Serial No. 10-2007-0082382, Notice of Allowance dated Nov. 1, 2013, 2 pages.
European Patent Office Application Serial No. 09151792.0, Search Report dated Nov. 7, 2013, 8 pages.
U.S. Appl. No. 12/672,835, Final Office Action dated Dec. 19, 2013, 18 pages.
National Office of Intellectual Property of Vietnam Application No. 1-2010-01256, Office Action dated Sep. 26, 2013, 1 page.
Motorola, "LTE Random Access Procedure," 3GPP TSG-RAN WG2 #53, R2-061463, XP-007905045, May 2006, 4 pages.
Ericsson, "Random Access Procedures for LTE," Joint RAN1/RAN2 meeting on LTE, Tdoc R2-060866, Mar. 2006, 7 pages.
MAC Rapporteurs (Qualcomm Europe, Ericsson), "Text Proposal for MAC agreements," 3GPP TSG-RAN WG2 #59bis, R2-074531, Aug. 2007, 9 pages.
European Patent Office Application Serial No. 08841080.8, Search Report dated Feb. 14, 2014, 14 pages.
European Patent Office Application Serial No. 08842001.3, Search Report dated Feb. 21, 2014, 10 pages.
3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321 V1.0.0, XP-050377614, Sep. 2007, 18 pages (relevant pages: pp. 8-9,16-17).
Nokia Corp., et al., "MAC Header Format," 3GPP TSG-RAN WG2 Meeting #59bis, R2-073891, XP-002602993, Oct. 2007, 5 pages.
Samsung, "MAC functions: ARQ," 3GPP TSG-RAN2 Meeting #51, Tdoc R2-060374, Feb. 2006, 5 pages.
NTT DoCoMo, Inc., "Uplink synchronization," 3GPP TSG RAN WG2 #57, R2-070781, Feb. 2007, 3 pages.
European Patent Office Application Serial No. 08793118.4, Search Report dated Dec. 10, 2013, 6 pages.
Korean Intellectual Property Office Application Serial No. 10-2008-0078476, Office Action dated May 29, 2014, 5 pages.
LG Electronics Inc., "Handling of HFN de-synchronization", R2-074746, 3GPP TSG-RAN WG2 #60, Nov. 2007, 2 pages.

(56) References Cited

OTHER PUBLICATIONS

European Patent Office Application Serial No. 08793028.5, Search Report dated Mar. 12, 2014, 7 pages.
U.S. Appl. No. 12/733,179, Notice of Allowance dated Mar. 21, 2014, 30 pages.
Motorola, "E-UTRA Random Access Channel TP from email discussion", R1-060885, 3GPP TSG RAN1#44-bis, Mar. 2006, 6 pages.
Panasonic, "Random access design for E-UTRA uplink", R1-061114, TSG-RAN WG1 Meeting#45, May 2006, 5 pages.
LG Electronics, "Resource request in Synchronized Case", R2-061018, TSG-RAN Working Group 2 #52, Mar. 2005. 2 pages.
NTT DoCoMo, "Random Access Channel Structure for E-UTRA Uplink", R2-061064, 3GPP TSG-RAN WG1 and WG2 Joing Meeting, Mar. 2006, 8 pages.
Samsung, "Optimization of contention resolution in aRACH", R2-072797, 3GPP TSG-RAN WG2#58bis, Jun. 2007, 3 pages.
NEC et al., "Need for MAC contention-resolution for non-initial access", R2-073092, 3GPP TSG-RAN WG2 Meeting #59, Aug. 2007, 3 pages.
Ericsson, "Text proposal on scheduling request triggering criterions for LTE", R2-073210, 3GPP TSG-RAN WG2 #59, Aug. 2007, 2 pages.
LG Electronics, "Discussion on Message 4 in Random Access", R2-073354, 3GPP TSG-RAN WG2 #59, Aug. 2007, 4 pages.
Korean Intellectual Property Office Application Serial No. 10-2008-0071933, Notice of Allowance dated Apr. 17, 2014, 2 pages.
The State Intellectual Property Office of the People's Republic of China Application Serial No. 200980100119.3, Office Action dated Feb. 24, 2014, 9 pages.
Cohen, "An Improved SSCOP-like Scheme for Avoiding Unnecessary Retransmissions and Achieving Ideal Throughput," IEEE, 1996, pp. 855-862.
Korean Intellectual Property Office Application Serial No. 10-2008-0058653, Office Action dated Apr. 25, 2014, 4 pages.
Korean Intellectual Property Office Application Serial No. 10-2008-0091287, Notice of Allowance dated Apr. 24, 2014, 4 pages.
U.S. Appl. No. 12/922,538, Office Action dated May 8, 2014, 11 pages.
LG Electronics, "Discussion on random access back-off procedure," 3GPP TSG-RAN WG2 #60bis, R2-080189, XP050138064, Jan. 2008, 5 pages.
European Patent Office Application Serial No. 09151778.9, Office Action dated May 14, 2014, 6 pages.
3rd Generation Partnership Project (3GPP), "Technical Specification Group Radio Access Network; Medium Access Control (MAC) protocol specification (Release 7)," 3GPP TS 25.321 V7.5.0, Jun. 2007, 141 pages.
MAC Rapporteurs, "Text Proposal for MAC agreements," 3GPP TSG-RAN WG2 #59bis, R2-074531, Aug. 2007, 10 pages.
3rd Generation Partnership Project (3GPP), "Technical Specification Group Radio Access Network; Evolved Universal Terrestrial Radio Access (E-UTRA) Radio Link Control (RLC) protocol specification (Release 8)," 3GPP TS 36.322 V8.0.0, Dec. 2007, 35 pages.
Korean Intellectual Property Office Application Serial No. 10-2008-0089718, Office Action dated Jul. 15, 2014, 4 pages.
Korean Intellectual Property Office Application Serial No. 10-2008-0101329, Office Action dated Jul. 22, 2014, 3 pages.
Korean Intellectual Property Office Application Serial No. 10-2009-0006356, Office Action dated Jul. 25, 2014, 4 pages.
Japan Patent Office Application Serial No. 2013-252060, Office Action dated Jul. 29, 2014, 2 pages.
Korean Intellectual Property Office Application Serial No. 10-2008-0078477, Notice of Allowance dated Jun. 24, 2014, 2 pages.
Korean Intellectual Property Office Application Serial No. 10-2008-0078645, Notice of Allowance dated Jun. 26, 2014, 2 pages.
U.S. Appl. No. 12/602,763, Office Action dated Aug. 4, 2014, 10 pages.

\* cited by examiner

EFFECTIVE SYSTEM INFORMATION RECEPTION METHOD

CROSS REFERENCE TO RELATED APPLICATIONS

This application is a continuation of U.S. patent application Ser. No. 12/143,607, filed on Jun. 20, 2008, now U.S. Pat. No. 8,190,144, issued on May 29, 2012, which claims the benefit of Provisional Application No. 60/945,340, filed Jun. 20, 2007, and Provisional Application No. 60/955,651, filed Aug. 14, 2007, and also claims the benefit of earlier filing date and right of priority to Korean application number 10-2008-0057283, filed Jun. 18, 2008, the contents of which are all hereby incorporated by reference herein in their entirety.

BACKGROUND OF THE INVENTION

1. Field of the Invention

The present invention relates to a wireless (radio) communication system for providing wireless communication services and a wireless (radio) terminal, and more particularly, to a method for informing, by the wireless communication system, to the terminal about information required for reception when the wireless terminal is connected to the wireless communication system, in which a base station updates system information according to a preset period, and the terminal efficiently receives or checks any update of the system information based on the period.

2. Description of the Related Art

FIG. 1 shows an exemplary network structure of an Evolved Universal Mobile Telecommunications System (E-UMTS) as a mobile communication system to which a related art and the present invention are applied. The E-UMTS system is a system that has evolved from the UMTS system, and its standardization work is currently being performed by the 3GPP standards organization. The E-UMTS system can also be referred to as a Long-Term Evolution (LTE) system.

The E-UMTS network can roughly be divided into an Evolved Universal Terrestrial Radio Access Network (E-UTRAN) and a Core Network (CN). The E-UTRAN generally comprises a terminal (i.e., User Equipment (UE)), a base station (i.e., eNode B), and an Access Gateway (AG) that is located at an end of the E-UMTS network and connects with one or more external networks. The AG may be divided into a part for processing user traffic and a part for handling control traffic. Here, an AG for processing new user traffic and an AG for processing control traffic can be communicated with each other by using a new interface. One eNode B may have one or more cells. An interface for transmitting the user traffic or the control traffic may be used among the eNode Bs. The CN may comprise an AG, nodes for user registration of other UEs, and the like. An interface may be used to distinguish the E-UTRAN and the CN from each other.

Radio interface protocol layers between the terminal and the network can be divided into a first layer (L1), a second layer (L2) and a third layer (L3) based on three lower layers of an Open System Interconnection (OSI) standard model widely known in communications systems. A physical layer belonging to the first layer provides an information transfer service using a physical channel. A Radio Resource Control (RRC) layer located at the lowest portion of the third layer controls radio resources between the terminal and the network. For this purpose, the RRC layer allows RRC messages to be exchanged between the terminal and the network.

FIGS. 2 and 3 show radio interface protocol architecture between a terminal and E-UTRAN based on 3GPP radio access network standards. Particularly, FIG. 2 shows radio protocol architecture in a control plane, and FIG. 3 shows radio protocol architecture in a user plane.

The radio interface protocol in FIGS. 2 and 3 has horizontal layers comprising a physical layer, a data link layer and a network layer, and has vertical planes comprising a user plane for transmitting user traffic and a control plane for transmitting control signals. The protocol layers in FIGS. 2 and 3 can be divided into a first layer (L1), a second layer (L2) and a third layer (L3) based on three lower layers of an Open System Interconnection (OSI) standard model widely known in communications systems. Hereinafter, each layer in the radio protocol control plane in FIG. 2 and a radio protocol user plane in FIG. 3 will be described.

A first layer, as a physical layer, provides an information transfer service to an upper layer using a physical channel. The physical layer is connected to its upper layer, called a Medium Access Control (MAC) layer, via a transport channel. The MAC layer and the physical layer exchange data via the transport channel. Data is transferred via a physical channel between different physical layers, namely, between the physical layer of a transmitting side and the physical layer of a receiving side. The physical channel is modulated based on an Orthogonal Frequency Division Multiplexing (OFDM) technique, and utilizes time and frequency as radio resources.

The MAC layer located at the second layer provides a service to an upper layer, called a Radio Link Control (RLC) layer, via a logical channel. The RLC layer of the second layer supports reliable data transmissions. The function of the RLC layer may be implemented as a functional block in the MAC layer. In this case, the RLC layer may not exist. A Packet Data Convergence Protocol (PDCP) layer of the second layer, in the radio protocol user plane, is used to efficiently transmit IP packets, such as IPv4 or IPv6, on a radio interface with a relatively narrow bandwidth. For this purpose, the PDCP layer reduces the size of an IP packet header which is relatively great in size and includes unnecessary control information, namely, a function called header compression is performed.

A Radio Resource Control (RRC) layer located at the lowest portion of the third layer is only defined in the control plane. The RRC layer controls logical channels, transport channels and physical channels in relation to establishment, re-configuration and release of Radio Bearers (RBs). Here, the RB signifies a service provided by the second layer for data transmissions between the terminal and the E-UTRAN. If an RRC connection is established between the RRC layer of the terminal and the RRC layer of the radio network, the terminal is in the RRC connected mode. Otherwise, the terminal is in an RRC idle mode.

A Non-Access Stratum (NAS) layer located at an upper portion of the RRC layer performs functions, such as session management, mobility management and the like.

One cell constructing an eNB is set to one of bandwidths of 1.25 MHz, 2.5 MHz, 5 MHz, 10 MHz, 20 MHz and the like, so as to provide downlink or uplink transmission services to multiple terminals. Here, different cells may be set to provide different bandwidths.

Downlink transport channels for transmitting data from a network to a terminal may comprise a Broadcast Channel (BCH) for transmitting system information, a Paging Channel (PCH) for transmitting paging messages and a downlink Shared Channel (SCH) for transmitting other user traffic or control messages. Traffic or control messages of a downlink point-to-multipoint service (multicast or broadcast service)

may be transmitted either via a downlink SCH, or via a separate downlink Multicast Channel (MCH). In addition, uplink transport channels for transmitting data from a terminal to a network may comprise a Random Access Channel (RACH) for transmitting an initial control message and an uplink Shared Channel (SCH) for transmitting user traffic or control messages.

Logical channels which are located at an upper portion of transport channels and mapped to the transport channels include a Broadcast Control Channel (BCCH), a Paging Control Channel (PCCH), a Common Control Channel (CCCH), a MBMS point-to-multipoint Control Channel/Multicast Control Channel (MCCH), a MBMS point-to-multipoint Traffic Channel/Multicast Traffic Channel (MTCH), and the like.

FIG. 4 shows a transmission on a control channel according to the related art.

A physical channel is composed of multiple sub-frames arranged on a time axis and multiple sub-carriers arranged on a frequency axis. Here, a single sub-frame includes a plurality of symbols on the time axis. One sub-frame is composed of a plurality of resource blocks, each of which includes a plurality of symbols and a plurality of sub-carriers. Also, each sub-frame can use particular sub-carriers of particular symbols (e.g., a first symbol) at the corresponding sub-frame for a Physical Downlink Control Channel (PDCCH), namely, a L1/L2 control channel. One sub-frame is a time duration of 0.5 ms. A Transmission Time Interval (TTI) as a unit time for which data is transmitted is 1 ms corresponding to two sub-frames.

In E-UMTS system, radio resource(s) of in a cell is allocated for an uplink radio resource(s) and a downlink radio resource(s). The base station (eNode B) is in charge of controlling or allocating of the uplink and downlink radio resource(s). Namely, the base station decides which terminal can use which or how much radio resource(s) for which particular time period(s). After such determination is made, the base station transmits those information to a corresponding terminal so that the terminal can perform the uplink or downlink transmission according to the information.

In conventional art, the terminal continuously uses the radio resource(s) in a connected mode. However, in recent years, there are many service based on an IP (Internet Protocol) packet, and continuously using of the radio resource(s) in the connected mode may cause a drawback because these IP packet based service does not always communicates packet (s) all the time, rather there are many periods that packets are not communicated even in the connected mode. As such, continuously allocating and using of the radio resource(s) for whole time period in a connected mode may be ineffective and undesirable. In order to solve this drawback, the radio resource(s) may be allocated only when there is service data to be communicated.

Hereinafter, description of an RRC state of a terminal and a RRC connection method will be given in detail. The RRC state refers to whether the RRC of the terminal is logically connected to the RRC of the E-UTRAN, thereby forming a logical connection with the RRC of the E-UTRAN. If the RRC of the terminal forms a logical connection with the RRC of the E-UTRAN, this is referred to as an "RRC connected state." Conversely, if there is no logical connection between the RRC of the terminal and the RRC of the E-UTRAN, this is referred to as an "RRC idle state." When the terminal is in the RRC connected state and, accordingly, the E-UTRAN can recognize the existence of the corresponding terminal according to units of cells, the E-UTRAN can effectively control the terminal. On the other hand, the E-UTRAN cannot recognize a terminal that is in idle state. The terminal in idle state can be managed by the CN according to units of location areas or units of tracking (routing) areas, which are areas larger than the cell. Specifically, the existence of a terminal in idle state is only recognized according to units of large areas, such as location areas or tracking (routing) areas, and the terminal must transition into the connected state in order to receive typical mobile communication services such as voice or data.

When a user initially turns on the power of the terminal, the terminal first detects an appropriate cell and maintains its idle state in the corresponding cell. The terminal in idle state forms an RRC connection with the RRC of the E-UTRAN through the RRC connection procedure and transitions into the RRC connected state when the RRC connection needs to be formed. There are several instances in which a terminal in idle state is required to form the RRC connection. For example, an uplink data transmission may be required due to a call attempt by a user or the transmission of a response message in response to a paging message received from the E-UTRAN may be required.

Hereinafter, description of system information will be given. The system information may include all information required for a terminal to know for a connection with a base station. Accordingly, before the terminal attempts to connect to the base station, it should receive all system information and always have the most updated system information. In addition, considering that all terminals within one cell should know the system information, the base station periodically transmits the system information.

The system information may be divided into a Master Information Block (MIB), a Scheduling Block (SB), a System Information Block (SIB) and the like. The MIB serves to inform the terminal about a physical construction of a corresponding cell (e.g., a bandwidth, and the like). The SB serves to inform the terminal about transmission information of SIBs (e.g., a transmission period and the like). The SIB refers to a collection (or aggregate) of system information that are related to each other. For instance, some SIB may include information of neighboring cells only, and other SIB may include information about an uplink radio channel only used by the terminal.

In the related art, in order for a terminal to receive appropriate services without causing any trouble in a system, the terminal should always have the most updated system information. However, such system information needs to be received by a terminal which has newly entered into a cell, or a terminal which has been newly turned on in a specific cell. Accordingly, the base station would repeatedly transmit the system information. In this case, requiring the terminal to always receive the system information may cause a problem of unnecessarily wasting power to a terminal which has already received the most updated system information. Accordingly, it is necessary for the terminal to read system information only if the system information is actually modified.

SUMMARY OF THE INVENTION

The present invention is to provide a method for efficiently receiving and updating system information, by a terminal, if the system information is modified, wherein a base station which transmits control information required for a connection with the base station (i.e., system information) to the terminal uses a minimum radio resources of a cell under its management, thereby maximizing efficiency of radio resources as well as minimizing power consumption of the terminal which should receive the control information.

To implement at least the above feature in whole or in parts the present invention may provide a method of receiving system information for an uplink access in a wireless communication system, the method comprising: receiving the system information and period information related to a modification of the system information; determining whether or not the system information needs to be modified; and receiving updated system information according to the period information if the system information is determined to be modified.

The present invention may also provide a method of transmitting system information for an uplink access in a wireless communication system, the method comprising: transmitting the system information and period information related to a modification of the system information; notifying whether or not the system information needs to be modified; and transmitting updated system information according to the period information if the system information is determined to be modified.

Additional features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

One aspect of the present invention is the recognition by the present inventors regarding the problems and drawbacks of the related art described above and explained in more detail hereafter. Based upon such recognition, the features of the present invention have been developed.

The present invention may be embodied in a 3GPP communication technology, in particular, in the Universal Mobile Telecommunications System (UMTS) system, a communication apparatus and method thereof. However, the present invention may also be applied to all wired/wireless communications to which the technical scope of the present invention can be applied.

Figure 1:
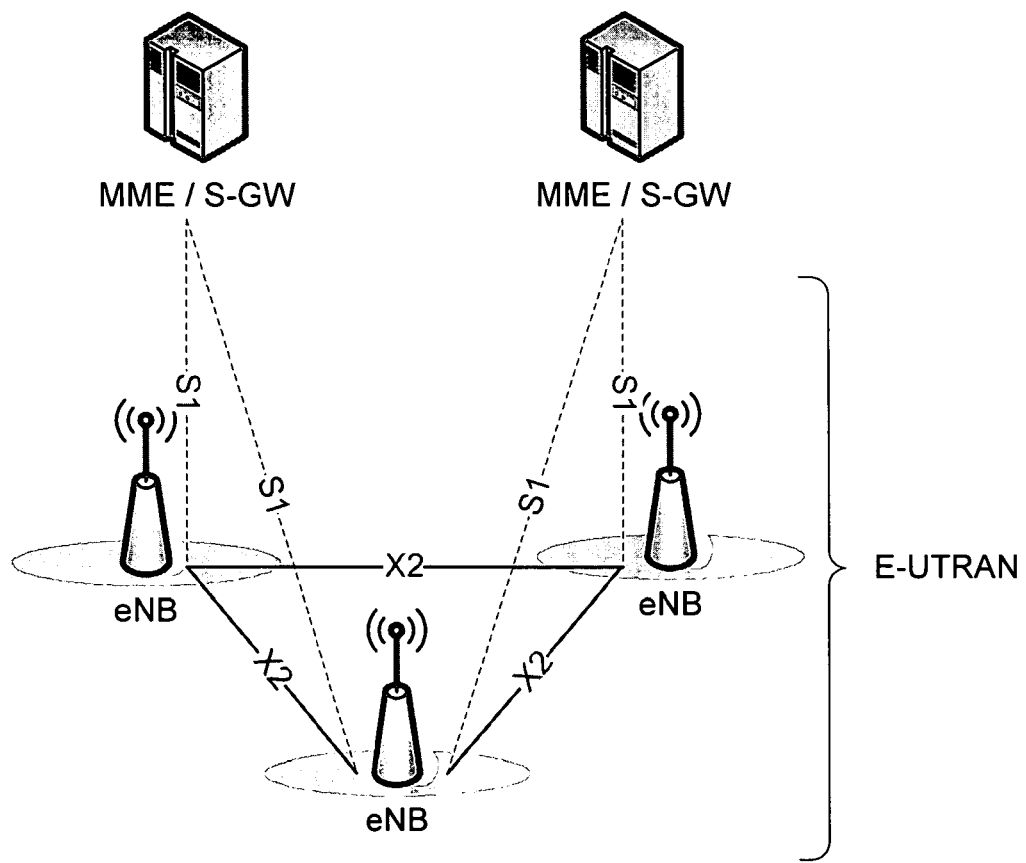
FIG. 1 shows an exemplary network structure of an Evolved Universal Terrestrial Radio Access Network (E-UTRAN) as a mobile communication system to which a related art and the present invention are applied.
Figure 2:
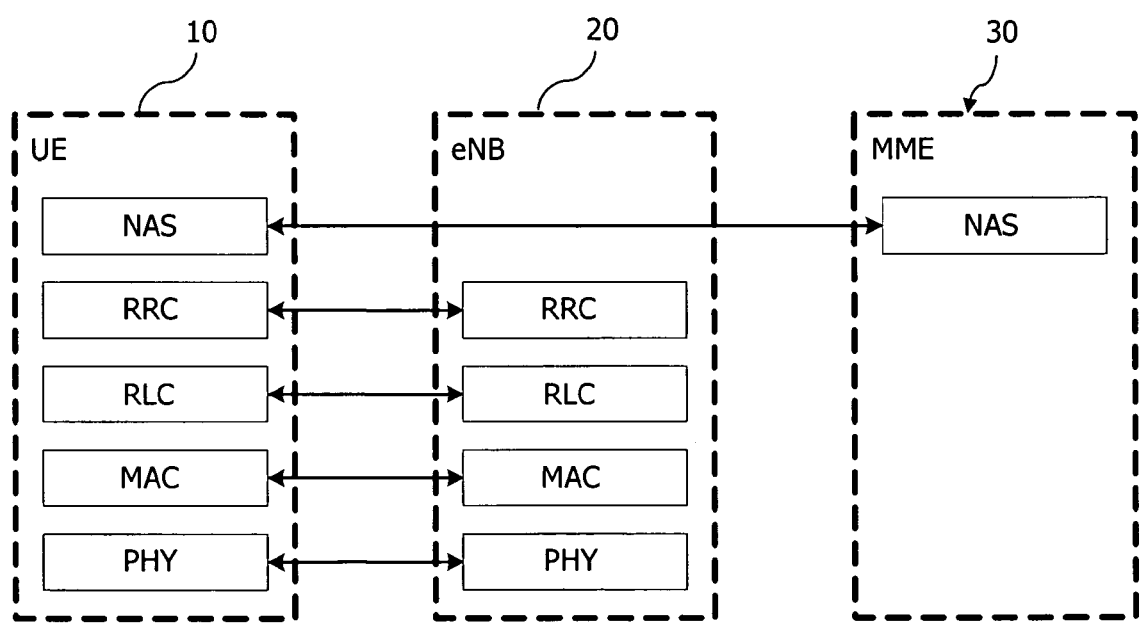
FIG. 2 shows a radio interface protocol architecture in a control plane between a terminal and a Evolved UMTS Terrestrial Radio Access Network (E-UTRAN) based on 3GPP radio access network standards.
Figure 3:
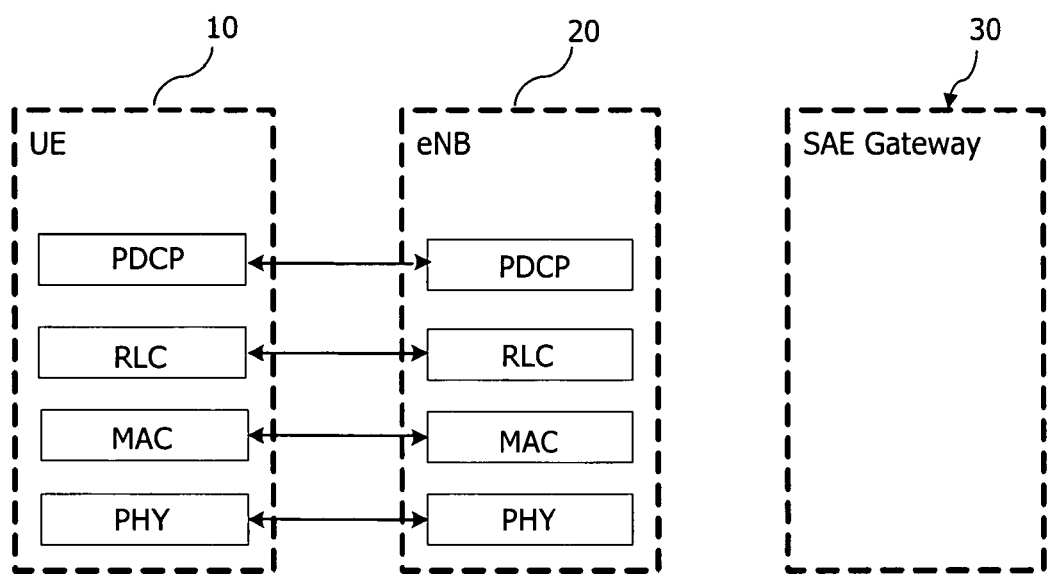
FIG. 3 shows a radio interface protocol architecture in a user plane between a terminal and a Evolved UMTS Terrestrial Radio Access Network (E-UTRAN) based on 3GPP radio access network standards.
Figure 4:
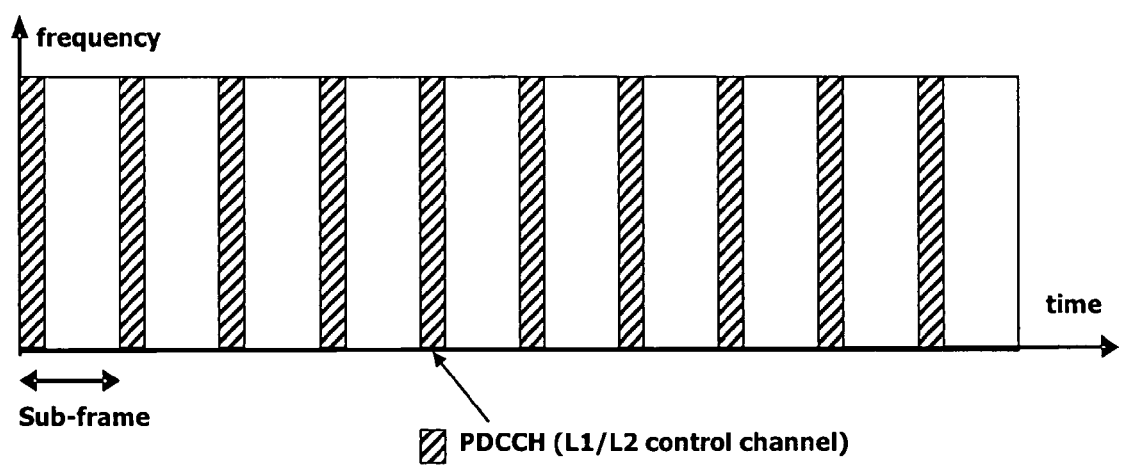
FIG. 4 shows an exemplary view of a related art physical channel structure for control channel transmission.
Figure 5:
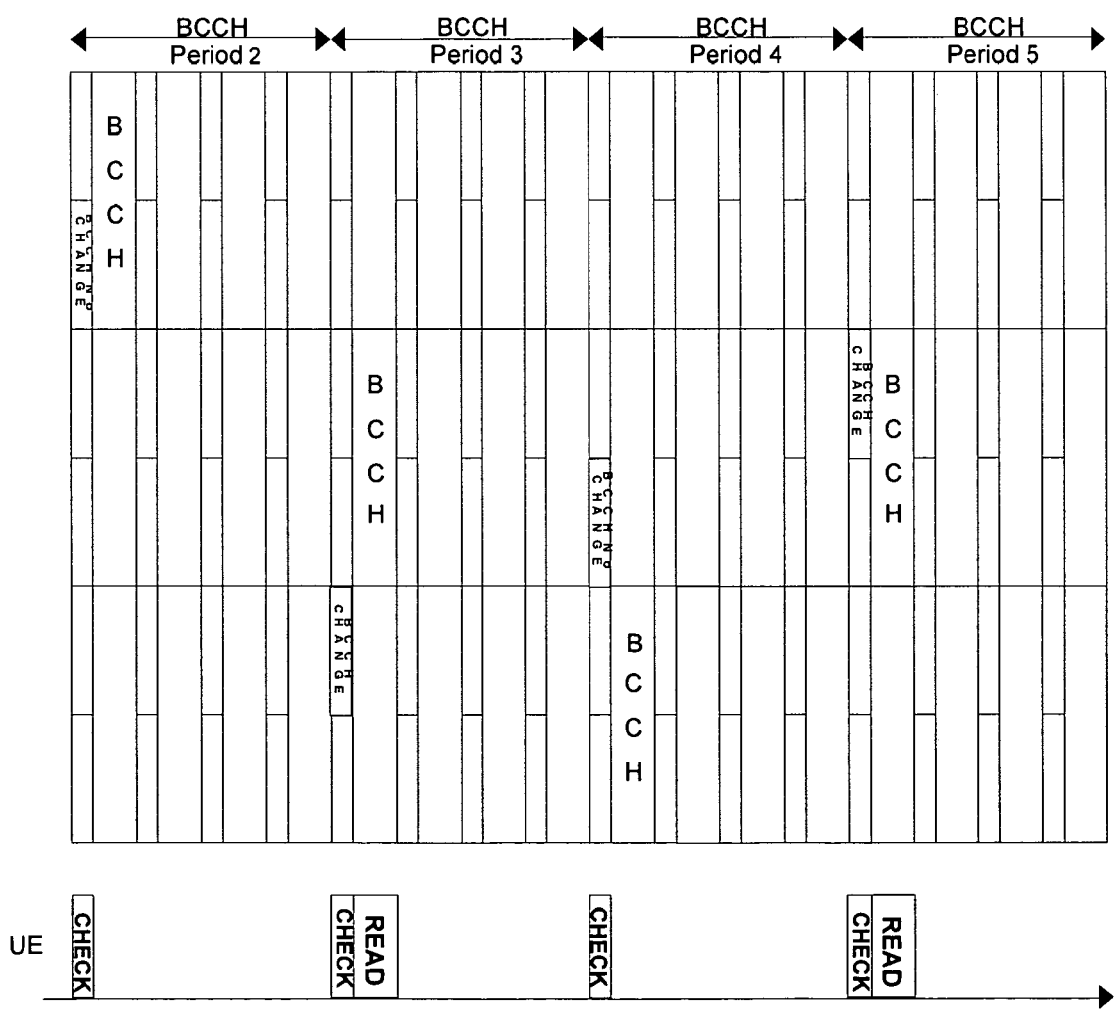
FIG. 5 shows a system information reception process according a first embodiment of the present invention.

Hereinafter, description of structures and operations of the preferred embodiments according to the present invention will be given with reference to the accompanying drawings. FIG. 5 shows an exemplary system information reception process according a first embodiment of the present invention. Referring to FIG. 5, a BCCH period refers to a time period (time duration) in which system information (SI) having the same content is transmitted. That is, the system information is transmitted with the same content in the same BCCH period. More specifically, if system information needs to be modified while being transmitted within a certain BCCH period, such system information may be modified in the next BCCH period or new (modified) system information may be transmitted in the next BCCH period. In FIG. 5, the terminal is notified in the BCCH period 3 that the BCCH has been modified. Accordingly, the terminal considers (determines) that new system information, other than that transmitted in the BCCH period 2, would be transmitted in the BCCH period 3. In FIG. 5, the terminal is notified in the BCCH period 4 that the BCCH is not modified. Accordingly, the terminal determines that the system information having the same content as that transmitted in the previous BCCH period (e.g., in the BCCH period 3) would be transmitted in the BCCH period 4, thereby not receiving the system information. That is, the BCCH period refers to a minimum time interval in which the system information can be modified. In other words, different system information cannot be transmitted within one BCCH period.

Figure 6:
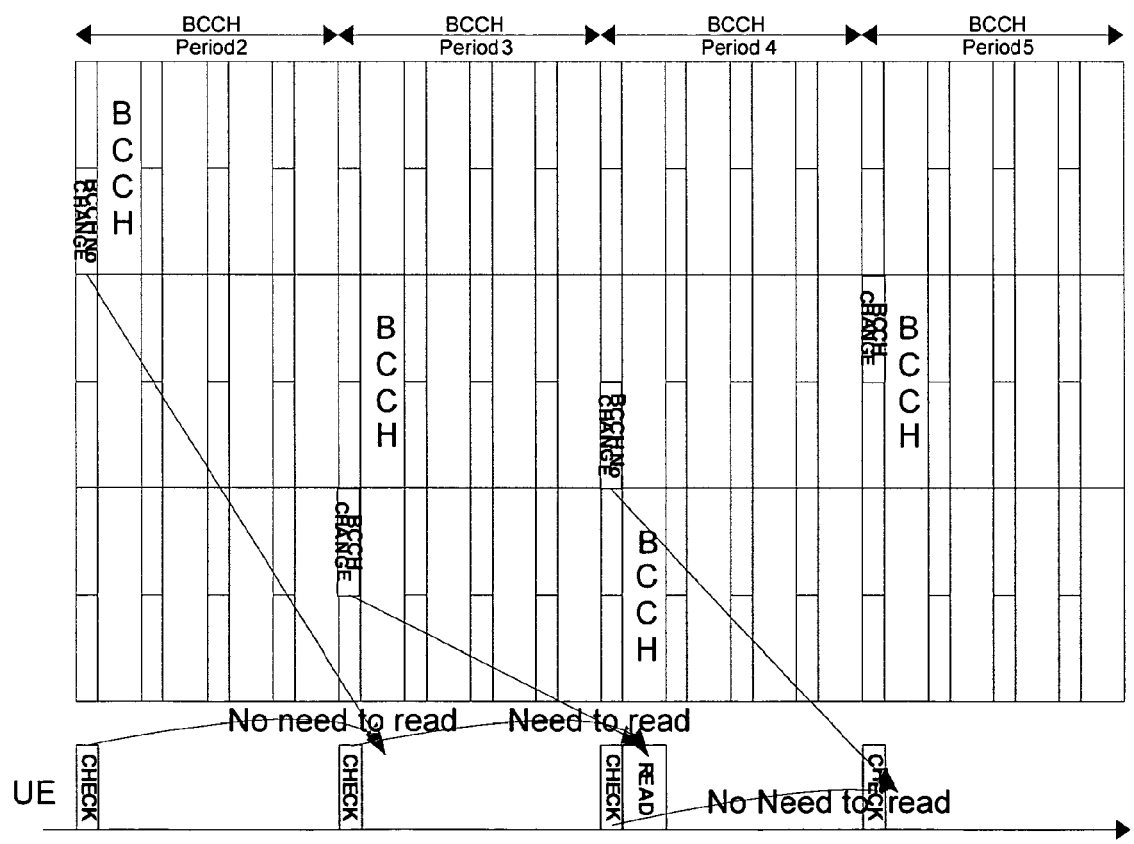
FIG. 6 shows a system information reception process according a second embodiment of the present invention.

FIG. 6 shows an exemplary system information reception process according a second embodiment of the present invention. Referring to FIG. 6, a period (duration) for indicating modification of system information by a base station, and a period (duration) for indicating the start of transmission of newly updated (modified) system information may be set differently. That is, if a modification of system information is indicated in a certain system information modification period, the modified system information can be transmitted in the next system information modification period. More specifically, the base station may inform the terminal that the system information has been modified in a $N^{th}$ system information modification period, and may transmit the actually modified system information in the next system information modification period.

For instance, if the terminal has obtained information indicating a modification of system information in a certain system information modification period, the terminal may be configured to receive modified system information in the next system information modification period. That is, if the base station informs the terminal about the modification of the system information in the $N^{th}$ system information modification period and, accordingly, the terminal receives such system information, the terminal would actually receive the system information in the next system information modification period.

The present invention is to provide a method for efficiently receiving and updating, by a terminal, system information if the system information is modified, wherein a base station which transmits to the terminal control information required for a connection with the base station (i.e., system information) uses a minimum radio resources of a cell under its management, thereby maximizing efficiency of radio resources as well as minimizing power consumption of the terminal which should receive the control information. For this, the present invention proposes to operate the terminal and the base station by using information regarding a period related to reception or modification of system information. Here, the period related to the reception or modification of the system information refers to a minimum period in which system information can be modified, or a minimum period in which the base station can modify the system information. In addition, the period related to the reception or modification of the system information may also refer to a minimum time in which the base station should wait until the next system information modification after modifying the system information. In addition, the period related to the reception or modification of the system information may refer to a minimum time in which the base station should modify system information and wait until modified system information is to be transmitted, if the base station notifies the terminal that system information has not been modified. The period related to the reception or modification of the system information may refer to a maximum period, in regard to the system information modification, which allows the terminal to check whether or not system information has been modified. The period related to the reception or modification of the system information may refer to a period in which the terminal periodically checks whether or not system information is modified or periodically receives system information. Here, the period related to the reception or modification of the system information may refer to a maximum time which does not need to further receive system information, or a time period without needing to check the modification of the system information after the terminal verifies that system information has not been modified as compared to the previously received system information. Further, the period related to the reception or modification of the system information may refer to a period for starting reception of modified system information after the terminal verifies that system information has been modified when compared to the previously received system information.

The present invention proposes to operate the terminal and the base station by using time information related to reception or modification of system information. Here, the time information related to the reception or modification of the system information may refer to when modified system information, as compared to the previous system information, can be transmitted. In addition, the time information related to the reception or modification of the system information may indicate a starting time when a first portion of modified system information is and/or can be transmitted. The time information related to the reception or modification of the system information may indicate a time when the base station can modify system information or start the transmission of modified system information. The time information related to the reception or modification of the system information may refer to a time when the base station can perform the next modification of system information after having modified the system information. In addition, the time information related to the reception or modification of the system information may indicate a time when the system can start the transmission of actually modified system information, if system information needs to be modified after the system informs the terminal that the system information has not been modified when compared to the previous system information. The time information related to the reception or modification of the system information may refer to a time, in regard to the modification of system information, when the terminal starts checking whether or not system information has been modified. In addition, the time information related to the reception or modification of the system information may refer to a limit time duration (or time period) in which there is no need to receive further system information, or a time when an operation to check whether or not system information modification is to be performed in the next time should be performed after the terminal checks that system information has not been modified when compared to the previously received system information. In addition, the time information related to the reception or modification of the system information may refer to a time when the terminal starts the reception of new (modified) system information after checking that the system information has been modified when compared to the previous system information. The time information related to the reception or modification of the system information may refer to a time when the terminal periodically checks whether or not system information is modified or periodically receives the system information.

The present invention proposes to operate the terminal and the base station by using time period (time duration) information related to reception or modification of system information. Here, the time period information related to the reception or modification of the system information may refer to a time period in which the system information is transmitted a number of times with the same content. System information may be transmitted with the same content or with different content in a certain time period designated by the time period information related to the reception or modification of the system information. The time period information related to the reception or modification of the system information may refer to the next time period which modified system information can be transmitted if the base station desires to change the system information that is being transmitted. Here, the time period information related to the reception or modification of the system information may refer to a unit of time in which the base station can modify system information, or a time period in which the base station can start the transmission of modified system information. Or, it may refer to a time period in which the base station may modify the system information. In addition, the time period information related to the reception or modification of the system information may refer to a time period in which the base station can perform a next modification of system information after changing the system information. In regard to the modification of the system information, it may refer to a time period in which the terminal starts checking whether or not the system information has been changed. The time period information related to the reception or modification of the system information may refer to a time period in which the terminal considers that the system information would be transmitted with the same content, after checking that the system information has not been modified as compared to the previously received system information. Or it may refer to a time period in which an operation should be performed to check whether or not system information modification is to be performed in the next time period. The time period information related to the reception or modification of the system information may refer to a time period in which the terminal periodically checks whether or not system information has been modified or periodically receives the system information.

That is, in the present invention, the base station sets the system information modification periods, and transmits the system information with the same content in the same system information modification period. Accordingly, the base station may transmit system information with different content in different system information modification period only. That is, the system information modification period refers to a time period in which the system information is transmitted with the same content.

In regard to the system information modification period, the base station informs the terminal about information, such as a starting point, a period of time duration, a length of time duration, and the like. Based on such information, the terminal would know information about each of the system information modification periods. Accordingly, in the present invention, the base station is configured to set system information modification periods and notify information related to the system information modification periods. The terminal considers (determines) that system information of the same content is transmitted within the same system information modification period. Accordingly, if it is checked that the system information is not modified in a current system information modification period, the terminal determines that the system information has not been modified in this system information modification period as compared to the previous system information, thereby not reading the system information. In addition, if the terminal checks that the system information has not been modified in the current system information modification period, the terminal checks whether or not the system information would be modified in the next system information modification period. If the system information is determined to be modified in the current system information modification period, the terminal would read the system information. Here, when the system information should be read, the terminal would read such information in the current system information modification period. Accordingly, in the present invention, the base station sets the system information modification periods and notifies information related to such system information modification periods. The system is configured to transmit the system information of the same content within the same system information modification period. Accordingly, if the base station determines that system information should be modified within a certain system information modification period during its transmission, the base station would transmit the system information that are already being transmitted within the current system information modification period, and then transmit modified system information in the next system information modification period.

The system information change may only occur at specific radio frames (i.e., concept of a modification period is used). The system information messages may be transmitted a number of times with the same content within the modification period, as defined by its scheduling. The modification period boundaries are defined by SFN mod N, where N is configured by system information. When the network changes all or some of the system information, it first notifies the terminal (UEs) about this change, and this notification may be done throughout a modification period. The notification may include a radio network temporary identifier (RNTI). In the next modification period, the network may transmit the updated system information. Upon receiving a change notification, the terminal (UE) may know that the current system information is valid until the next modification period boundary. After this boundary, the terminal may acquire the new system information.

The present invention may provide a method of receiving system information for an uplink access in a wireless communication system, the method comprising: receiving the system information and period information related to a modification of the system information; determining whether or not the system information needs to be modified; and receiving updated system information according to the period information if the system information is determined to be modified, wherein the period information comprises at least one of a starting point of a modification period, an ending point of the modification period or total time duration (period) of the modification period, the period information indicates a minimum period in which the system information can be modified, the period information indicates a minimum period in which a base station can change the system information, the period information indicates a minimum time in which the base station should wait for the next updated system information after changing the system information, the period information indicates a maximum period in which the terminal checks whether or not the system information has been modified, the period information indicates a starting time to receive the modified system information, the modified system information is also received in the certain modification period when the period information is received in a certain modification period, the modified system information is received in another modification period, other than the certain modification period when the period information is received in a certain modification period, or the modified system information is received in the next modification period after the certain modification period when the period information is received in a certain modification period.

It can be also said that the present invention also provide a method of transmitting system information for an uplink access in a wireless communication system, the method comprising: transmitting the system information and period information related to a modification of the system information; notifying whether or not the system information needs to be modified; and transmitting updated system information according to the period information if the system information is determined to be modified, wherein the period information comprises at least one of a starting point of a modification period, an ending point of the modification period or total time duration (period) of the modification period, the period information indicates a minimum period in which the system information can be modified, the period information indicates a minimum period in which a base station can change the system information, the period information indicates a minimum time in which the base station should wait for the next updated system information after changing the system information, the period information indicates a maximum period in which the terminal checks whether or not the system information has been modified, the period information indicates a starting time to transmit the modified system information, the modified system information is also transmitted in the certain modification period when the period information is transmitted in a certain modification period, the modified system information is transmitted in another modification period, other than the certain modification period when the period information is transmitted in a certain modification period, or the modified system information is transmitted in the next modification period after the certain modification period when the period information is transmitted in a certain modification period.

Namely, the present invention has an effect of efficiently receiving and updating, by the terminal, system information if the system information is modified, in which the base station which transmits to the terminal control information required for a connection with the base station (i.e., system information) uses a minimum radio resources of a cell under its management, thereby maximizing efficiency of radio resources as well as minimizing power consumption of the terminal which should receive the control information.

Although the present invention is described in the context of mobile communications, the present invention may also be used in any wireless communication systems using mobile devices, such as PDAs and laptop computers equipped with wireless communication capabilities (i.e. interface). More-over, the use of certain terms to describe the present invention is not intended to limit the scope of the present invention to a certain type of wireless communication system. The present invention is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method of receiving updated system information in a wireless communication system, the method comprising:
   receiving, by a terminal, a notification for changing of system information, wherein the notification is received via a paging channel (PCH);
   receiving, by the terminal, the updated system information within a modification period and only after receiving the notification,
   wherein the modification period has boundaries which are defined by a system frame number (SFN) and a specific value (N) configured by the system information,
   wherein the modification period boundaries are defined by the SFN mod N,
   wherein the modification period is a Broadcast Control Channel (BCCH) modification period,
   wherein the notification is received through a current Broadcast Control Channel (BCCH) modification period and the updated system information is received within a next BCCH modification period,
   wherein the system information changes only occur at the modification period, and
   wherein the updated system information is received with same content within the modification period.

2. The method of claim 1, wherein current system information is valid until the modification period upon receiving the notification.

3. The method of claim 1, wherein the modification period indicates a minimum period in which the system information can be modified.

4. The method of claim 1, wherein the modification period indicates a minimum period in which a network can change the system information.

5. The method of claim 1, wherein the modification period indicates a minimum time in which the network should wait for the next updated system information after changing the system information.

6. The method of claim 1, wherein the modification period indicates a maximum period in which the terminal checks whether or not the system information has been modified.

7. A method of transmitting updated system information in a wireless communication system, the method comprising:
   transmitting, by a network, a notification for changing of system information, wherein the notification is transmitted through a paging channel;
   transmitting, by the network, the updated system information within a modification period and only after transmitting the notification,
   wherein the modification period has boundaries which are defined by a system frame number (SFN) and a specific value (N) configured by the system information,
   wherein the modification period boundaries are defined by the SFN mod N,
   wherein the modification period is a Broadcast Control Channel (BCCH) modification period,
   wherein the notification is transmitted through a current Broadcast Control Channel (BCCH) modification period and the updated system information is transmitted within a next BCCH modification period,
   wherein the system information changes only occur at the modification period, and
   wherein the updated system information is transmitted with same content within the modification period.

8. The method of claim 7, wherein current system information is valid by a terminal until the modification.

9. The method of claim 7, wherein the modification period indicates a minimum period in which the system information can be modified.

10. The method of claim 7, wherein the modification period indicates a minimum period in which the network can change the system information.

11. The method of claim 7, wherein the modification period indicates a minimum time in which the network should wait for the next updated system information after changing the system information.

12. The method of claim 7, wherein the modification period indicates a maximum period in which a terminal receiving the updated system information checks whether or not the system information has been modified.

13. A mobile terminal for receiving updated system information in a wireless communications system, the mobile terminal comprising:
a processor configured to perform:
receiving a notification for changing of system information, wherein the notification is received via a paging channel (PCH);
receiving the updated system information within a modification period and only after receiving the notification,
wherein the modification period has boundaries which are defined by a system frame number (SFN) and a specific value (N) configured by the system information,
wherein the modification period boundaries are defined by the SFN mod N,
wherein the modification period is a Broadcast Control Channel (BCCH) modification period,
wherein the notification is received through a current Broadcast Control Channel (BCCH) modification period and the updated system information is received within a next BCCH modification period,
wherein the system information changes only occur at the modification period, and
wherein the updated system information is received with same content within the modification period.

* * * * *